United States Patent [19]

Tate et al.

[11] 4,094,798

[45] June 13, 1978

[54] OIL RECOVERY PROCESS USABLE IN HIGH TEMPERATURE FORMATIONS CONTAINING HIGH SALINITY WATER WHICH MAY INCLUDE HIGH CONCENTRATIONS OF POLYVALENT IONS

[75] Inventors: Jack F. Tate; Jim Maddox, Jr., both of Houston, Tex.

[73] Assignee: Texaco Inc., New York, N.Y.

[21] Appl. No.: 754,788

[22] Filed: Dec. 27, 1976

Related U.S. Application Data

[63] Continuation-in-part of Ser. No. 554,891, Mar. 3, 1975, abandoned.

[51] Int. Cl.$^2$ ............................................. E21B 43/22
[52] U.S. Cl. .............................. 252/8.55 D; 166/273; 166/274
[58] Field of Search ............... 252/8.55 D, DIG. 12; 166/274, 275, 273

[56] References Cited

U.S. PATENT DOCUMENTS

| | | | |
|---|---|---|---|
| 3,004,056 | 10/1961 | Nunn et al. | 252/89 X |
| 3,498,379 | 3/1970 | Murphy | 166/275 X |
| 3,653,440 | 4/1972 | Reisberg | 166/273 |
| 3,724,544 | 4/1973 | Tate | 166/275 X |
| 3,777,818 | 12/1973 | Feuerbacher et al. | 166/275 X |
| 3,811,505 | 5/1974 | Flournoy et al. | 252/8.55 X |
| 3,827,497 | 8/1974 | Dycus et al. | 252/8.55 X |

*Primary Examiner*—Herbert B. Guynn
*Attorney, Agent, or Firm*—Carl G. Ries; Thomas H. Whaley; Jack H. Park

[57] ABSTRACT

A fluid containing a dual surfactant system and a process using the fluid for recovering petroleum from petroleum formations containing high salinity water, e.g. from 50,000 to 225,000 parts per million which may include from about 200 to about 14,000 parts per million polyvalent ions such as calcium and/or magnesium dissolved therein and a method of using said fluid in a surfactant flooding oil recovery process. The surfactant system comprises a water-soluble salt of petroleum sulfonate or an alkyl or alkylaryl sulfonate wherein the alkyl chain may have from 5 to 25 carbon atoms, plus a phosphate ester surfactant with an average molecular weight not to exceed 1000. The surfactant combination is stable up to at least 225° F and resistant to bacterial attack and inhibits scale formation.

12 Claims, No Drawings

OIL RECOVERY PROCESS USABLE IN HIGH TEMPERATURE FORMATIONS CONTAINING HIGH SALINITY WATER WHICH MAY INCLUDE HIGH CONCENTRATIONS OF POLYVALENT IONS

CROSS REFERENCE TO RELATED APPLICATION

This is a continuation-in-part of copending application Ser. No. 554,891 filed Mar. 3, 1975, now abandoned, for "Oil Recovery Process Usable in High Temperature Formations Containing Water Having High Concentrations of Polyvalent Ions."

BACKGROUND OF THE INVENTION

1. Field of the Invention

This invention relates to a surfactant fluid and to a method for recovering petroleum from subterranean high temperature, high salinity water-containing petroleum formations using the fluid.

2. Description of the Prior Art

Petroleum is normally recovered from subterranean formations in which it has accumulated by penetrating said formation with one or more wells and pumping or permitting the petroleum to flow to the surface through these wells. Recovery of petroleum from petroleum containing formations is possible only if certain conditions exist. There must be an adequate amount of petroleum in the formation, and there must be sufficient porosity and permeability or interconnected flow channel throughout the formation to permit the flow of fluids therethrough if sufficient pressure is applied to the fluid. When the subterranean petroleum containing formation has natural energy present in the form of an underlying active water drive, or gas dissolved in the petroleum which can exert sufficient pressure to drive the petroleum to the producing well, or a high pressure gas cap above the petroleum within the petroleum reservoir, this natural energy is utilized to recover petroleum. Recovery of petroleum by utilizing natural energy is referred to as primary recovery. When the natural energy source is depleted, or in the instance of those formations which do not originally contain sufficient natural energy to permit primary recovery operations, some form of supplemental recovery process must be applied to the formation to extract additional petroleum. Supplemental recovery is frequently referred to in the literature as secondary or tertiary recovery, although in fact it may be primary, secondary or tertiary in sequence of employment.

Water flooding, commonly referred to as secondary recovery, involves the injection of water into the subterranean, petroliferous formation for the purpose of displacing petroleum toward the producing well. This is the most economical and widely practiced supplemental recovery method. Water does not displace petroleum with high efficiency, however, since water and oil are immiscible, and also because the interfacial tension between water and oil is quite high. Persons skilled in the art of oil recovery have recognized this weakness of water flooding and many additives have been described in the prior art for decreasing the interfacial tension between the injected water and the formation petroleum. For example, U.S. Pat. No. 2,233,381 (1941) disclosed the use of polyglycol ether as a surface active agent or surfactant to increase the capillary displacement efficiency of an aqueous flooding medium. U.S. Pat. No. 3,302,713 and U.S. Pat. No. 3,468,377 (1969) describe the use of petroleum sulfonates for oil recovery. Other surfactants which have been proposed for oil recovery include alkyl sulfates and alkyl or alkylaryl sulfonates.

The above described surfactants are satisfactory for surfactant flooding in petroliferous formations only if the formation water salinity is below about 5000 parts per million total dissolved solids. Petroleum sulfonate is a popular and desirable surfactant because of its high surface activity and low unit cost, although it also suffers from the limitation that it can be used only when the formation water salinity is less than about 5000 parts per million total dissolved solids. If the formation water salinity exceeds about 5000 parts per million total dissolved solids, petroleum sulfonates precipitate rendering them inoperative for oil recovery and in some instances causing plugging of the formation.

Many subterranean petroleum-containing formations are known to exist which contain water whose salinity exceeds 5000 parts per million total dissolved solids. Limestone formations are commonly encountered which contains highly saline water including polyvalent ions in a concentration from 200 to as high as 20,000 parts per million in the original connate water, and the formation water after the formation has been subjected to flooding with fresh water may have concentrations of calcium and/or magnesium from about 500 to about 15,000 parts per million.

Other petroleum formations are known to contain formation waters with salinities as high as 225,000 parts per million total dissolved solids. Since many surfactants taught in the art as being usable for oil recovery operations precipitate when exposed to aqueous environments having salinities greater than about 5000 parts per million total dissolved solids, such surfactants cannot be used in limestone or high salinity reservoirs. If an aqueous solution of petroleum sulfonate, for example, is injected into a reservoir containing high salinity water, the petroleum sulfonate precipitates immediately on contacting the high salinity formation water. In such a process, the flood water would have essentially no surfactant present in it to decrease the interfacial tension between water and petroleum and so little or no petroleum displacement is obtained. Furthermore, precipitated petroleum sulfonate plugs small flow channels in subterranean petroleum-containing formations decreasing the formation porosity and injectivity, thereby causing a substantial decrease in the oil displacement efficiency.

In U.S. Pat. No. 3,508,612, J. Reisberg et al, 1970, an oil recovery method employing a mixture of sulfonates, specifically petroleum sulfonates and sulfated, ethoxylated alcohol is disclosed which results in improved oil recovery in the presence of high salinity water; however, the polyethoxy sulfate hydrolyzes at temperatures greater than 125° F.

Nonionic surfactants, such as polyethoxylated alkyl phenols, polyethoxylated aliphatic alcohols, carboxylic esters, carboxylic amides, and polyoxyethylene fatty acid amides, have a somewhat higher tolerance of salinity and polyvalent ions such as calcium or magnesium than do the more commonly utilized anionic surfactants. While it is technically feasible to employ a nonionic surfactant solution to decrease the interfacial tension between the injected aqueous displacing medium and petroleum contained in some high salinity formations, such use would not be economically feasible for several reasons. Nonionic surfactants are not as effective on a per unit weight bases as are the more commonly used anionic surfactants, and furthermore, the nonionic surfactants have a higher cost per unit weight than do the anionic surfactants. Moreover, polyethoxylated alkyl phenol nonionic surfactants exhibit a reverse solubility relationship with temperature and become insoluble at temperatures in the range of 80° F to 180° F depending on the degree of ethoxylation and fluid salinity, making them ineffective in many oil formations.

The use of certain combinations of anionic and nonionic surfactants in high salinity or hard water formations is also taught in the art. For example, U.S. Pat. No. 3,792,731 describes the use of anionic and nonionic surfactant in saline environments. U.S. Pat. No. 3,811,505 discloses the use of alkyl or alkylaryl sulfonates or phosphates and polyethoxylated alkyl phenols in hard water environments; U.S. Pat. No. 3,811,504 teaches the use of a three component mixture including an alkyl or alkylaryl sulfonate, a polyethoxylated alkyl phenol and a sulfated, ethoxylated surfactant in hard water environments. U.S. Pat. No. 3,811,507 teaches the use of a water soluble salt of a linear alkyl or alkylaryl sulfonate and a polyethoxyated alkyl sulfate in very hard water environments. All of the nonionic surfactants described therein are only effective under conditions where they are soluble, and all have cloud points from 80° F to 180° F depending on salinity and so are ineffective above their cloud points.

Other problems encountered in surfactant flooding operations of the type taught in the prior art include susceptibility of the surfactant to bacterial degradation in the formation, and serious scale deposition in the production well through which formation fluids and previously injected aqueous fluids are produced to the surface of the earth.

Thus, it can be seen that while many surfactants have been proposed for supplemental oil recovery use, there is a substantial, unfulfilled need for a surfactant composition usable in the presence of high salinity formation waters which may include calcium and/or magnesium in excess of 500 parts per million especially in formations hotter than 125° F. There is an especially serious need for surfactant systems with the foregoing properties which are additionally resistant to bacterial degradation in the formation.

SUMMARY OF THE INVENTION

This invention pertains to a novel dual surfactant system and to a method for recovering petroleum from subterranean petroleum-containing formations using said surfactant systems, said petroleum-containing formation having a temperature greater than 125° F and also containing water having a salinity in excess of 50,000 parts per million total dissolved solids which may include polyvalent ions such as calcium and/or magnesium, in the range of from about 200 to about 20,000 parts per million. The novel surfactant system is an aqueous fluid containing at least two components: (1) from about 0.05 to about 5.0 percent by weight of an anionic organic sulfonate surfactant such as a water soluble salt of petroleum sulfonate or an alkyl or alkylaryl sulfonate, such as, for example, sodium dodecylbenzene sulfonate, plus (2) from about 0.05 to about 5.0 percent by weight of a phosphate ester surfactant containing alkyl or arylalkyl groups. From about 2 percent pore volume to about 50 percent pore volume of the surfactant solution is injected into the formation. The surfactant solution may be displaced through the formation by injecting water, or it may be followed immediately by a quantity of thickened water such as is formed by mixing a small amount of a hydrophilic polymer such as polyacrylamide or polysaccharide in water to increase its viscosity, which is in turn displaced through the formation with water. The surfactants are compatible with water salinities greater than 50,000 parts per million total dissolved solids and/or from 500 to 14,000 parts per million calcium and/or magnesium; the are also stable over the temperature range of 125° to 225° F, and additionally, the phosphate ester inhibits scale deposition in the production well. Our invention therefore incorporates the novel surfactant fluid and the method of using said surfactant fluid for the recovery of petroleum from subterranean, high temperature petroleum-containing formations containing water whose salinity exceeds 50,000 parts per million total dissolved solids which may include polyvalent ions in a concentration of from about 500 to about 14,000 parts per million.

DESCRIPTION OF THE PREFERRED EMBODIMENTS

This invention concerns a novel, multiple surfactant-containing aqueous fluid which can be used in subterranean petroleum-containing formations which formations contain high salinity water, e.g. water containing from 50,000 to 225,000 parts per million total dissolved solids, which may include from 200 to 14,000 parts per million polyvalent ions such as calcium and/or magnesium. There are many petroleum-containing formations which contain high salinity water and which are at a temperature of up to 225° F. In addition, the surfactants are thermally stable in solution up to temperatures of at least 225° F, neither becoming insoluble nor hydrolyzing. The surfactant combination may thus be used in formations which contain water whose salinity is from 50,000 to 225,000 parts per million total dissolved solids, and at temperatures of from 125° to 225° F, conditions under whch nonionic surfactants cannot be used because of their cloud point limitations and polyethoxy sulfates cannot be used because of their susceptibility to hydrolysis.

The combination of thermal stability and divalent ion tolerance is unique, since many surfactants are either thermally stable but intolerant to high salinity, or tolerant of high salinity but either decompose as by hydrolysis, or become insoluble at temperatures over 125° F. Moreover, the combination of thermal stability and salinity tolerance is quite valuable since many oil formations are at a temperature over 125° F. and contain high salinity water.

We have found that an aqueous solution of two surfactant materials, in a critical concentration range, will effectively reduce the interfacial tension between oil and water, and will function effectively in the fluid salinities in the range of 50,000 parts per million to 225,000 parts per million total dissolved solids which may include calcium and magnesium in a concentration of from about 200 to about 14,000 parts per million total hardness. The dual surfactant system comprises (1) A sulfonated surfactant with average molecular weight not to exceed about 360 such as petroleum sulfonate or a compound having the following general formula:

$$[R - X]Y$$

wherein R is an alkyl radical, linear or branched, having from 5 to 20 and preferably from 8 to 14 carbon atoms, or an alkylaryl radical having from 5 to 14 carbon atoms in the alkyl chain, X is a sulfonate (SO$_3$), and Y is a monovalent cation such as sodium, potassium, lithium or ammonium. If R is linear dodecylbenzene, X is sulfonate and Y is ammonia, the material is ammonium dodecylbenzene sulfonate.

(2) A phosphate ester surfactant with average molecular weight not to exceed 1000 having the general formula:

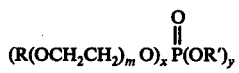

wherein R is an alkylaryl or an alkyl radical, linear or branched, having from 12 to 24 carbon atoms, m is a number between 1 and 20, both x and y are 1 or 2 and the sum of x and y is 3, and R' is hydrogen or a monovalent cation such as sodium, potassium, lithium or ammonium.

Both of the above surfactant materials are individually known in the art as having surface active properties and available commercially from surfactant manufacturers.

Neither the alkyl or alkylaryl sulfonate nor the phosphate ester surfactant is suitable for use alone in oil formations under the temperature and salinity conditions described above, but surprisingly the two materials when used together in the proper ratio exhibit excellent performance over a broad salinity and temperature range.

The optimum concentration of each material which constitutes the novel surfactant system of our invention will vary to a degree depending on the salinity and/or hardness and other characteristics of the aqueous environment in which it is to be used as well as by the formation temperature. Ideally, ths should be determined by test utilizing the actual formation water in which the material will be used. Generally, from about 0.05 percent to about 5.0 percent and preferably from about 0.2 to about 0.5 percent by weight of the phosphate ester surfactant will be effective within the 50,000 to 225,000 parts per million total dissolved solids salinity range of the aqueous environment. The ratio of organic sulfonate to the phosphate ester surfactant may range from about 8 to 1 to about 1 to 8.

The surfactant solution is advantageously prepared in field water, generally a low gravity brine. Moreover, it is preferable that the surfactant solution contain salinity and divalent ions in about the same range as the formation water if the surfactant mixture can be tailored to yield optimum results at these values of salinity and hardness.

Ideally, the optimum concentration of each of the surfactants should be determined experimentally for each application, since the optimum ratio of the two surfactants will depend on numerous factors but particularly on the salinity and calcium and magnesium concentration of the formation water in which they will be used. As a general rule, higher concentrations of the second surfactant, the phosphate ester, are preferred in use in water having salinity values within the higher portions of the stated salinity range.

In the practice of our invention, from about 2 to about 50 pore volume percent of an aqueous solution containing from about 0.05 to about 5.0 percent and preferably from about 0.2 to about .8 percent of an organic sulfonate anionic surfactant and from about 0.05 to about 5.0% and preferably from 0.2 to about 0.8 percent by weight of the phosphate ester surfactant, is injected into the subterranean petroleum-containing formation to which this invention is to be applied. Any formation having water whose salinity is from 50,000 to 225,000 parts per million total dissolved solids and formation temperatures of from 125° to 225° F can effectively be exploited by means of the subject process. The process may be employed in temperatures lower than 125° F also, but less expensive systems operable below 125° F are usually available. Ordinarily, water injection will have been applied to the reservoir first, although this is not a requirement for the employment of this invention. Water injection or water flooding is, however, a desirable first phase of the recovery program for several reasons. It is less expensive to conduct than the surfactant flooding program, and furthermore, the injection of a relatively fresh water into a formation containing high salinity connate water which may include high concentrations of calcium and/or magnesium will result in the lowering of the connate water salinity and hardness to a point where a chosen surfactant composition will operate more effectively. As will be seen later hereinafter in this specification, it is not necessarily to be expected that the optimum interfacial tension reduction will be achieved at the lowest possible water salinity or hardness. This furnishes still another reason for the desirability that actual experimentation be undertaken utilizing the available formation water or a relatively close facsimile thereof, to determine the optimum surfactant composition and also the optimum salinity and hardness at which the chosen composition will function.

The combination described hereinabove and in greater detail hereinafter below can be used under conditions of lower temperature if the salinity ranges are more restricted. Specifically, the combination of our invention may be utilized in formations containing water whose salinity is from about 100,000 to about 225,000 parts per million total dissolved solids where the formation temperature is greater than about 145° F. If the formation water salinity varies from about 150,000 to about 225,000 parts per million total dissolved solids, the surfactant combination of our invention is suitable for use so long as the formation temperature is greater than about 115° F.

In formations wherein it is known or expected that surfactants will be absorbed from solution onto the formation rock, it is preferable either to provide in a preflush and/or in the surfactant solution, sacrificial inorganic material such as sodium carbonate or sodium polyphosphate or organic sacrificial agents such as lignosulfonates to prevent or reduce surfactant adsorption, or to use more than the optimum concentration of surfactant as determined by capillary tests or other means to compensate for adsorption. It is generally satisfactory to use up to 5% by weight surfactant, and this surplus material need only be added to the first ten percent or so of the surfactant slug injected with subsequent portions of the total surfactant solution slug containing lesser amounts of each surfactant. Both surfactant may tend to adsorb onto the formation equally, or there may be a preferential adsorption of either the organic sulfonate or phosphate ester surfactant used, depending on the characteristics of the formation rock.

If the viscosity of the petroleum contained in the subterranean formation is sufficiently high, the ratio of viscosities of injected fluid to displaced fluid, or mobility ratio as it is referred to in the art of supplemental oil recovery, will result in an adverse sweep efficiency, and so it is preferable to utilize an additive to increase the viscosity of the injected aqueous fluid to more nearly match the viscosity of the subterranean petroleum. Hydrophilic polymers such as polyacrylamides or polysaccharides are effective for this purpose in a concentration from about 100 to about 1500 parts per million in an aqueous solution. The use of this amount of polymer results in a fluid having an apparent viscosity of from about 5 to 15 centipoise, and depending on the oil viscosity, this will generally improve the mobility ratio sufficiently that satisfactory sweep efficiency can be achieved. It may be desirable to add a small concentration of the hydrophilic polymer to the surfactant solution, but it is often satisfactory to follow the surfactant solution with a mobility buffer which comprises an aqueous solution of the hydrophilic polymer. This mobility buffer itself is then displaced through the formation by injecting water into the formation. Whether or not the mobility buffer solution is used, the final phase of the supplemental oil recovery operation will comprise injecting water into the formation to displace the surfactant solution and the displaced oil through the formation to the producing well. Water injection will be continued until the water/oil ratio at the producing well rises to about 30 to 40.

Alternating injection of small slugs of an inert gas such as nitrogen, air, or carbon dioxide with water or with the aqueous solution of hydrophilic polymer described above may also be used advantageously after the surfactant flood.

The invention can be more fully understood by reference to the following field example, which is offered only for the purpose of illustration and is not intended to be limitative or restrictive of the invention, which will be defined more precisely hereinafter in the claims.

FIELD EXAMPLE

A subterranean, petroleum-containing limestone formation is found at a depth of 9500 feet. The limestone formation is 40 feet thick and the porosity is 30%. The field is exploited first by primary production, utilizing a square grid patter with 400 foot line spacing between wells. At the conclusion of primary recovery, which recovers only 25% of the petroleum originally in place within the reservoir, injection wells are drilled in the center of each square grid to convert the field to an inverted five spot pattern for water injection. Although a large field entails a multiplicity of the square grid patterns, each 400 feet on a side and with an injection well in the center, it is possible to analyze the entire field by considering only a single grid unit. Water is injected into the injection well and production of oil is continued from the production wells until the water/oil ratio reaches 30, which is considered to be the economic limit for continued production. At the conclusion of the water flooding operation, only 45% of the oil originally in place in the reservoir has been recovered, and some form of tertiary recovery operation must be resorted to in order to obtain any significant portion of the remaining petroleum.

The formation temperature is 200° F. The formation water is analyzed and found to contain 6000 parts per million calcium and 2000 parts per million magnesium, and the salinity is 110,000 parts per million total dissolved solids. Capillary displacement tests are performed using actual formation water and it is determined that the maximum capillary displacement results from the use of 0.30 percent by weight of the ammonium salt of dodecylbenzene sulfonic acid, and 0.30 percent by weight of a phosphate ester surfactant. Since the formation is known to absorb both surfactants, the first 10% of the surfactant slug will contain 2% by weight surfactant, and the remainder of the slug will contain 0.45 percent of each material. The surfactant solution is prepared in a field brine containing 6000 parts per million calcium, 2000 parts per million magnesium with salinity of about 110,000 parts per million total dissolved solids.

Since the pattern used results in 70 percent sweep efficiency, the total pore volume swept by injected fluid is:

400 Ft. × 400 Ft. × 40 Ft. × 0.30 × 0.70 = 1,344,000 Cu. Ft. A ten percent pore volume surfactant slug or 134,000 cu. ft. (1,047,000 gallons) is used. The first ten percent of this slug, or 104,700 gallons contains, two percent by weight of each material. The balance contains 0.30 percent of the organic sulfonate surfactant and 0.30 percent of the phosphate ester surfactant. The surfactant solution is followed by injecting 1,000,000 gallons of an aqueous solution containing 500 parts per million of polysaccharide, a hydrophilic polymer, to increase the viscosity of the injected aqueous fluid to about 8 centipoise. Finally, water is injected into the formation to displace the surfactant, thickened water solution, and the displaced oil through the formation toward the production wells. Water injection is continued until the water/oil ratio rises to about 30, at which point the residual oil saturation is reduced to 10 percent and approximately 73 percent of the original oil in place is recovered.

EXPERIMENTAL

In order to establish the operability of this invention, and further to determine the optimum operating conditions of the novel surfactant composition of our invention, the following experimental work was performed.

Capillary (thin tube) displacement tests provide a convenient and accurate method for determining the performance of surfactants in any desired hardness and salinity ranges for the chemical system employed. The tests are performed by filling a number of closed and capillary tubes with the particular crude oil being studied, and submerging the capillary tubes horizontally into the desired aqueous phase. In the instance of the subject series of tests, the aqueous phase comprised the indicated mixture of synthetic connate water in fresh water plus the surfactant mixture being evaluated. In each instance of displacement of oil by the aqueous phase, a meniscus is formed at the oil-water interface. The only force tending to displace oil from the capillary tube was the force resulting from the difference in specific gravities of the two fluids. This force was offset by the interfacial tension between the oil and formation water, and it was observed that essentially no displacement occurred in the instance of connate water - fresh water blends having no surfactant added thereto. When the surfactant composition was successful in producing a movement in the meniscus, the distance traveled by the meniscus in millimeters in a 5 minute exposure interval in the chemical system is recorded, and it is this displacement in millimeters that is recorded. There was essentially no displacement of the meniscus in the instance of capillary tubes submerged in the formation water containing no surfactant of any kind, indicating that the interfacial tension between the crude oil and the formation water was too great to permit displacement of the oil from the capillary. The optimum reduction in interfacial tension and so the maximum oil recovery is achieved using combinations which produce the maximum value of the displacement in the capillary tubes.

The surfactants tested were as follows. The anionic surfactant was SA 597 manufactured by Conoco. This material is an ammonium salt of dodecylbenzene sulfonic acid. The phosphate ester surfactant was Wayphos M-100 manufactured by Wayland Division of Philip A. Hunt Corp. This is a mixture of sodium salts of phosphate esters as described above in the formula, wherein $m$ is 10, R is a nonyl group and there is a mixture comprising 55% monoester and 45% diester.

The surfactant solution was formulated as follows:
0.3% Wayphos M-100
0.3% SA-597
0.2% (2000 ppm) Calcium
10.0% Sodium Chloride Five capillary displacement tests were performed to demonstrate the effectiveness of the dual surfactant mixture at this particular concentration of calcium. Also, the solution pH was varied over the range of 5 to 9 to determine the optimum pH. The data are given in Table I below.

TABLE I

| | Capillary Displacements |
|---|---|
| pH | Capillary Displacement mm, at 5 minutes |
| 5 | 2.5 |
| 6 | 8.6 |
| 7 | 11.5 |
| 8 | 10.5 |
| 9 | 2.8 |

It can be seen that this particular surfactant mixture with the stated hardness and salinity performs best at a pH from about 6 to 8. Other blends and solution hardness values can be expected to produce optimum responses over somewhat different pH ranges.

Similar capillary displacement tests demonstrated that when either the dodecylbenzene sulfonic acid or the phosphate ester surfactant was used alone in solutions having the salinity and hardness used in the above tests, zero capillary displacement was observed, indicating that neither material was effective when used along at this salinity.

No precipitation of the calcium salt of SA-597 nor bacterial attack of either surfactants was observed in the system after several days period.

Another series of tests were performed to determine the variations in cloud point of various ethoxylated alkyl phenol nonionic surfactants at various salinities. The nonionic surfactants were all ethoxylated nonyl phenols, with the average number of ethoxy groups per molecule being varied from 9.5 to 15. Cloud points were determined in distilled water, in a ten percent brine, and in a sample of field water having a salinity of 65,000 parts per million total dissolved solids including 7,000 parts per million hardness. The data are summarized in Table II below.

TABLE II

CLOUD POINTS OF NONIONIC SURFACTANTS °F

| | Salinity ppm total dissolved solids | | | |
|---|---|---|---|---|
| Number of EO Groups per Molecule | 0 | 50,000 | 65,000 Including 7,000 ppm $Ca^{++} + Mg^{++}$ | 100,000 |
| 9.5 | 130° F | 105° F | 104° F | 86 |
| 11.0 | 163 | 128 | 130 | 110 |
| 12.0 | 178 | 150 | 142 | 125 |
| 13.0 | 190 | 162 | — | 134 |
| 14.0 | 195 | 170 | — | 141 |
| 15.0 | 200 | 175 | — | 145 |

The foregoing table indicates that the cloud points of the ethoxylated nonyl phenol nonionic surfactants varied with degree of ethoxylation from 130° to 200° F in distilled water, from 105° F to 175° F in 50,000 parts per million salinity brine (5% sodium chloride) and from 86° to 145° F in 100,000 parts per million salinity (10% sodium chloride). Moreover, when the salinity included divalent ions, the reduction in cloud point was equally severe. Similar ethoxylated alkyl phenols exhibit continuing cloud point reductions at increased salinities. The range of cloud point values for a salinity of 150,000 ppm total dissolved solids is about 65° F to 115° F. Accordingly, ethoxylated nonylphenols are not operable above temperatures of from 105° F to 175° F at salinities of about 50,000 ppm and above about 86° F to 145° F for salinities of about 100,000 ppm total dissolved solids. Ethoxylated alkanols exhibit very similar cloud point variations with salinity. The surfactant fluid of our invention employing the phosphate ester surfactants rather than nonionic surfactants are operable over the entire range of salinities from 50,000 to 225,000 parts per million total dissolved solids at temperatures up to at least 225° F.

Thus, we have demonstrated that aqueous solutions of a combination of surfactants, namely water-soluble salts of petroleum sulfonate or an alkyl or alkylaryl sulfonate and phosphate ester surfactants containing arylaryl groups perform efficiently in high salinity systems whereas neither used alone exhibit surfactant properties in high salinity environments. Moreover, the surfactants are temperature stable up to at least 225° F, resistant to bacterial attack, and inhibit scale formation.

While our invention has been described in terms of a number of illustrative embodiments, it is not so limited since many variations thereof will be apparent to persons skilled in the art of supplemental oil recovery without departing from the true spirit and scope of our invention. It is our intention and desire that our invention be limited and restricted only by those limitations and restrictions contained in the claims appended hereinafter below.

We claim:

1. A method for recovering petroleum from a subterranean, petroleum-containing, permeable formation penetrated by at least one injection well and at least one production well, both wells being in fluid communication with the formation, said formation containing water whose salinity is from about 50,000 to about 225,000 parts per million total dissolved solids, the formation temperature being greater than 175° F, comprising:

a. introducing into the formation via the injection well an aqueous surfactant-containing fluid to displace petroleum toward the production well, said fluid comprising (1) from .05 to 5.0 percent by weight of an anionic organic sulfonate surfactant having an average equivalent weight not to exceed 360 selected from the group consisting of water-soluble sodium, potassium or ammonium salts of petroleum sulfonates, alkyl sulfonates having from 5 to 20 carbon atoms, alkylaryl sulfonates having from 5 to 14 carbon atoms in the alkyl chain and mixtures thereof;

(2) from .05 to about 5.0 percent by weight of a phosphate ester surfactant with an average molecular weight not to exceed about 1,000 having the following formula:

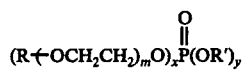

wherein R is an alkyl or alkylaryl radical having from 12 to 24 carbon atoms, $m$ is a number from 1 to 20, $x$ and $y$ are 1 or 2 and the sum of $x$ and $y$ is 3, and R' is hydrogen, sodium, potassium, lithium or ammonium;

(3) said surfactant fluid salinity being at least 50,000 parts per million total dissolved solids; and b. recovering petroleum displaced by the surfactant fluid from the formation via the production well.

2. A method as in claim 1 wherein the sulfonate and the phosphate ester surfactants are each present in amounts ranging from about 0.2 to 0.8 weight percent.

3. A method as in claim 1 wherein the ratio of sulfonates to phosphate surfactant is from about 8:1 to 1:8.

4. A method as recited in claim 1 wherein the volume of surfactant solution injected is from about 2 to about 50 pore volume percent based on the volume of formation to be swept by the injected fluid.

5. A method for recovering petroleum from a subterranean, permeable, petroleum-containing formation penetrated by at least one injection well and at least one production well, both wells being in fluid communication with the formation, said formation containing water whose salinity is from about 100,000 to 225,000 parts per million total dissolved solids, the formation temperature being greater than 145° F, comprising:

a. introducing into the formation via the injection well an aqueous, surfactant-containing fluid to displace petroleum toward the production well, said fluid comprising (1) from 0.05 to 5.0 percent by weight of and anionic organic sulfonate surfactant having an average equivalent weight not to exceed 360 selected from the group consisting of water-soluble sodium, potassium or ammonium salts of petroleum sulfonates, alkyl sulfonates having from 5 to 20 carbon atoms, alkylaryl sulfonates having from 5 to 14 carbon atoms in the alkyl chain and mixtures thereof;

(2) from .05 to 5.0 percent by weight of a phosphate ester surfactant with an average molecular weight not to exceed about 1,000 having the following formula:

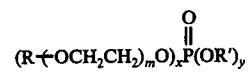

wherein R is an alkyl or alkylaryl radical having from 12 to 24 carbon atoms, $m$ is a number from 1 to 20, $x$ and $y$ are 1 or 2 and the sum of $x$ and $y$ is 3, and R' is hydrogen, sodium, potassium, lithium or ammonium;

(3) said surfactant fluid salinity being at least 100,000 parts per million total dissolved solids; and b. recovering petroleum displaced by the surfactant fluid from the formation via the production well.

6. A method as recited in claim 5 wherein the concentration of organic sulfonate is from about 0.20 to about 0.80 percent by weight.

7. A method as recited in claim 5 wherein the concentration of phosphate ester is from about 0.2 to about 0.8 percent by weight.

8. A method as recited in claim 5 wherein the ratio of organic sulfonate to phosphate ester is from about 1:8 to about 8:1.

9. A method for recovering petroleum from a subterranean, petroleum-containing, permeable formation penetrated by at least one injection well and at least one production well, both wells being in fluid communication with the formation, said formation containing water whose salinity is from about 150,000 to 225,000 parts per million total dissolved solids, the formation temperature being greater than 115° F, comprising:

a. introducing into the formation via the injection well an aqueous surfactant-containing fluid to displace petroleum toward the production well, said fluid comprising:

(1) from about .05 to about 5.0 percent by weight an anionic organic sulfonate surfactant having an average equivalent weight not to exceed 360 selected from the group consisting of water-soluble sodium, potassium or ammonium salts of petroleum sulfonates, alkyl sulfonates having from 5 to 20 carbon atoms, alkylaryl sulfonates having from 5 to 14 carbon atoms in the alkyl chain and mixtures thereof; and (2) from about .05 to about 5.0 percent by weight of a phosphate ester surfactant with an average molecular weight not to exceed about 1,000 having the following formula:

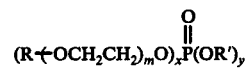

wherein R is an alkyl or alkylaryl radical having from 12 to 24 carbon atoms, $m$ is a number from 1 to 20, $x$ and $y$ are 1 or 2 and the sum of $x$ and $y$ is 3, and R' is hydrogen, sodium, potassium, lithium or ammonium;

(3) said surfactant fluid salinity being at least 150,000 parts per million total dissolved solids; and b. recovering petroleum displaced by the surfactant fluid from the formation via the production well.

10. A method as recited in claim 9 wherein the concentration of organic sulfonate is from about 0.2 to about 0.8 percent by weight.

11. A method as recited in claim 9 wherein the concentration of phosphate ester is from about 0.2 to about 0.8 percent by weight.

12. A method as recited in claim 9 wherein the volume of surfactant solution injected is from about 2 to about 50 pore volume percent based on the volume of formation to be swept by the injected fluid.

* * * * *